US012656659B2

(12) United States Patent　　　　　(10) Patent No.:　US 12,656,659 B2

Lima Neto et al.　　　　　　　　　　　(45) Date of Patent:　　　Jun. 16, 2026

(54) ELECTRONICALLY ACTUATED CAMERA PRIVACY SHUTTER

(71) Applicant: Lenovo (Singapore) Pte. Ltd., Singapore (SG)

(72) Inventors: Hildebrando De Oliveira Lima Neto, Carapicuiba-SP (BR); Arthur Arruda, São Paulo (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 160 days.

(21) Appl. No.: 18/481,294

(22) Filed: Oct. 5, 2023

(65) Prior Publication Data

US 2025/0116915 A1　　Apr. 10, 2025

(51) Int. Cl.
　　*G03B 9/36*　　　　(2021.01)
　　*G06F 1/16*　　　　(2006.01)

(52) U.S. Cl.
　　CPC ............. *G03B 9/36* (2013.01); *G06F 1/1679* (2013.01); *G06F 1/1686* (2013.01)

(58) Field of Classification Search
　　CPC .......... G03B 11/04; G03B 9/36; G06F 1/1679
　　See application file for complete search history.

(56) References Cited

U.S. PATENT DOCUMENTS

2013/0222609 A1* 8/2013 Soffer ..................... G06F 21/81
　　　　　　　　　　　　　　　　　　　　　348/207.1
2018/0059510 A1* 3/2018 Gustaveson, II .... G03B 11/043

FOREIGN PATENT DOCUMENTS

EP　　　　　　0567935 A1 *　4/1993

* cited by examiner

*Primary Examiner* — Minh Q Phan

(74) *Attorney, Agent, or Firm* — Schwegman Lundberg & Woessner, P.A.

(57) ABSTRACT

A privacy device includes a shutter moveably mounted along a first axis to a frame supporting a camera having a lens. A closing solenoid is supported by the frame and including a closing core. Control circuitry is coupled to the closing solenoid to cause the shutter to cover the lens. An opening solenoid that includes an opening core may be used to move the shutter to an open position to uncover the lens.

14 Claims, 6 Drawing Sheets

ELECTRONICALLY ACTUATED CAMERA PRIVACY SHUTTER

BACKGROUND

Some electronic apparatuses, such as a laptop personal computer (laptop PC), a tablet computer (tablet PC), and a multi-functional mobile phone (smart phone), usually come with a display. Typically, these electronic apparatuses employ a larger liquid crystal panel as a screen with a relatively narrow bezel surrounding the screen. In addition, many of these electronic apparatuses have a camera located on the display surface around the liquid crystal panel.

Such a camera on the display surface has a lens that is typically directed to a user, and the user may feel uneasy because the camera may capture images of them contrary to their intention even when the camera does not operate. Typically, a manually slidable mechanical shutter may be used to cover the lens and prevent image capture.

SUMMARY

A privacy device includes a shutter moveably mounted along a first axis to a frame supporting a camera having a lens. A closing solenoid is supported by the frame and including a closing core. Control circuitry is coupled to the closing solenoid to cause the shutter to cover the lens. An opening solenoid that includes an opening core may be used to move the shutter to an open position to uncover the lens.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
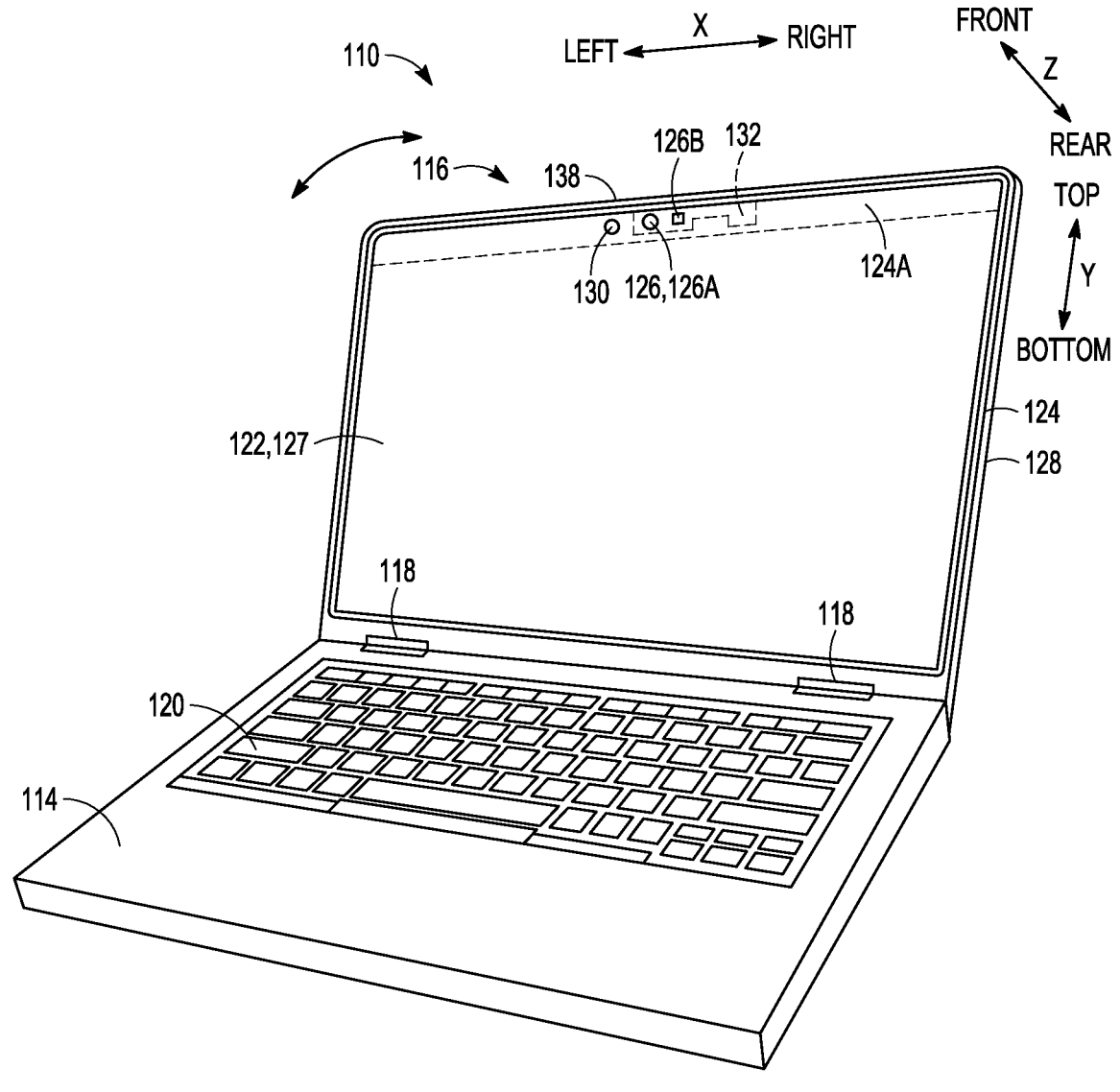
FIG. 1 is a perspective view of a laptop computer that is an electronic apparatus according to an example embodiment.

FIG. 1 is a perspective view of a laptop PC 110 that is an electronic apparatus according to one embodiment. The electronic apparatus is not limited to such a laptop PC 110, which may be a desktop PC, a mobile tablet, or a multi-functional mobile phone.

This laptop PC 110 includes a chassis 114 and a lid 116 that is openable/closable relative to the chassis 114 via hinges 118. The laptop PC with the lid 116 closed is compact and is suitable for mobile use. The upper face of the chassis 114 includes a keyboard 120.

The following may refer to the left-right direction of the lid 116 as X direction, the height direction of the lid 116 as Y direction, and the thickness direction of a display device 122 as Z direction. The direction where the display surface of the display device 122 and the surface of a frame 124, which will be described below, are directed will be referred to as front (forward), and the opposite direction will be referred to as rear (rearward).

The lid 116 includes the display device 122 that is disposed at the front face as the display surface, the frame 124 surrounding the display device 122, a camera 126 disposed at an upper frame 124a that is an upper side of the frame 124, the camera 126 shooting an image of the front, and a rear cover 128.

The display device 122 is a rectangular and thin color liquid crystal display, and occupies a major part of the front face of the lid 116. The frame 124 is narrow, which may be called a narrow bezel. A glass 127 is disposed on the front face of the display device 122. The glass 127 is rectangular. The glass 127 may be configured to enable a touch panel.

The camera 126 is a slim and horizontally long optical device that is disposed at a center part of the upper frame 124a of the frame 124. The camera 126 has a lens 126a at a center part, and may have an indicator 126b on the right. An infrared port 130 is disposed on the left of the camera 126. The camera 126 and the infrared port 130 are directed to the front, i.e., to the user. The indicator 126b displays the operating state of the camera 126. The upper frame 124a comes with a lens cover unit 132 that is slidable along X direction between a first position and a second position in the frame 124. The lid 116 is thin in Z direction.

Figures 2A, 2B:
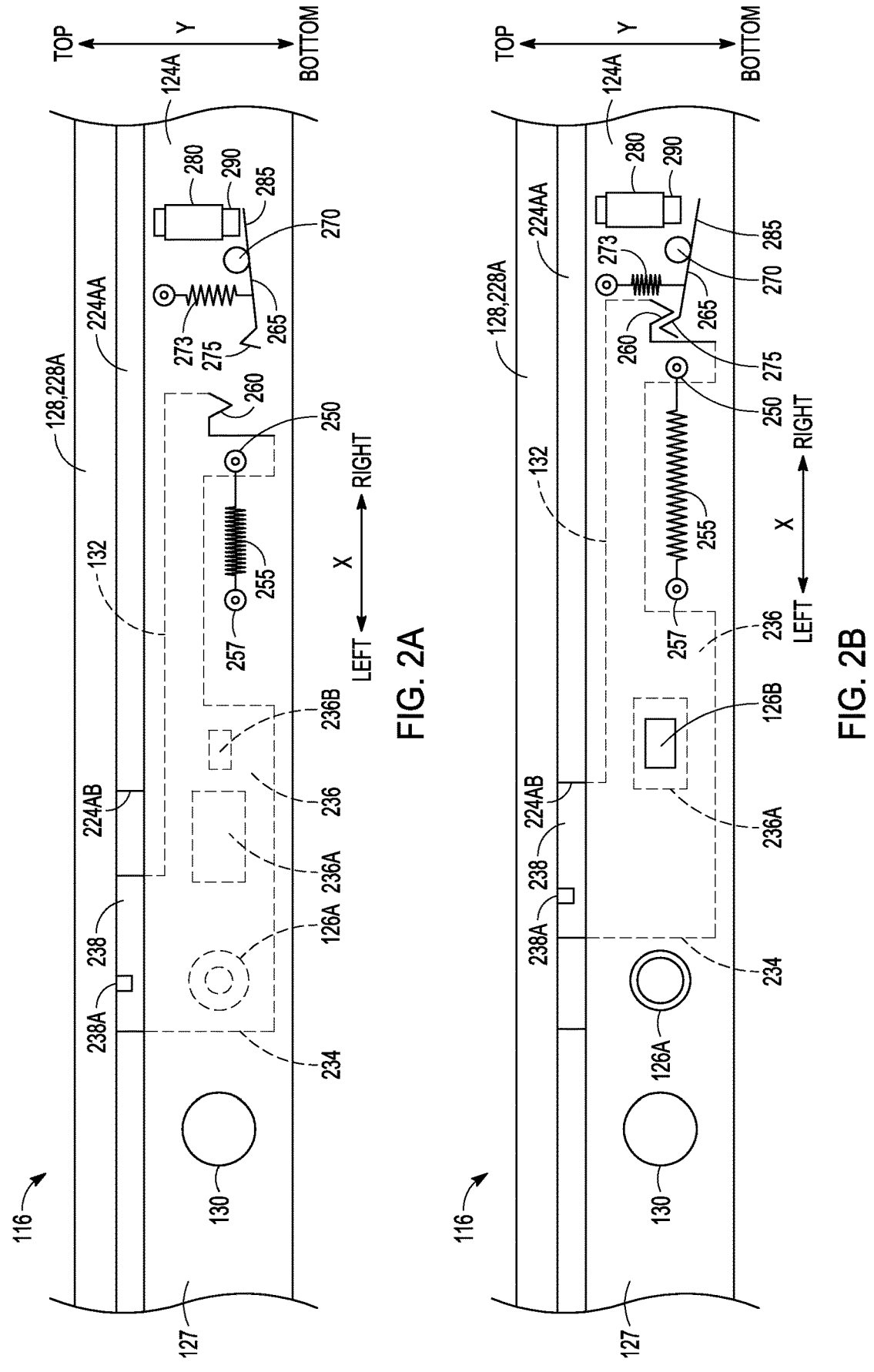
FIG. 2A is a block diagram illustrating a lens cover unit at a first, closed position according to an example embodiment.
FIG. 2B is a block diagram illustrating a lens cover unit at a second, open position according to an example embodiment.

FIG. 2A illustrates the lens cover unit 132 at the first, closed position, and FIG. 2B illustrates the lens cover unit 132 at the second, open position.

As illustrated in FIG. 2A, when the lens cover unit 132 having a lens cover 234 and an indicator cover 236 is at the first closed position on the left, the lens cover 234 covers the lens 126a from the front and the indicator cover 236 covers the indicator 126b from the front. In the lens cover unit 132, at least a part of the lens cover 234 and the indicator cover 236 are made of a material that does not transmit light. The lens cover 234 covering the lens 126a from the front prevents shooting by the camera 126 contrary to the user's intention and so gives a sense of ease to the user. The lens 126a covered with the lens cover 234 gives integrity with the frame 124 in terms of the design.

The lens cover unit 132 has a knob 238 at the upper part. The user's operation with the knob 238 in X direction slides the lens cover unit 132 between the first position and the second position. The knob 238 has a cut-out 238a, which allows the user to operate the knob easily with a finger or a nail. The cut-out 238a is located just above the lens cover 234, so that the user is able to operate the knob 238 intuitively. The knob 238 is short in Y direction and extends in X direction.

In one example, lens cover unit 132 includes first post 250 for coupling to a first end of a first spring 255. A second post 257 is supported by laptop 110 and a second end of the first spring 255. First spring 255 is configured to bias the lens cover unit 132 in a closed position, to cover the lens 126A. Lens cover unit 132 also has a notch 260 positioned to engage with a locking lever 265 that is supported about a pivot point 270 coupled to laptop 110.

A second spring 273 has a first end coupled to the locking lever 265 at a position between the pivot point 270 and an end with a protrusion 275 configured to mate with the notch 260 when the lens cover unit 132 is moved to align the notch 260 with the protrusion 275. In one example, the locking lever 265 is biased by the second spring 273 such that the protrusion 275 and notch 260 engage and provide resistance to further movement of the lens cover unit 132 from the open position. The resistance is sufficient to prevent lateral force from the first spring 255 from moving the lens cover unit 132 to the closed position. It should be noted that the relative positions of a notch and protrusion may be reversed in various examples where referenced throughout the application, as the retention and releasing functions will be similar regardless of which element includes the notch or corresponding protrusion.

A first solenoid 280 is supported by the laptop 110 in a fixed position proximate to an end 285 of the locking lever 265 opposite the end that includes the protrusion 275. Solenoid 280 includes a core 290 positioned to attract the locking lever end 285 in response to current being applied to the solenoid 280. In response to such energization, as shown in FIG. 2A, the locking lever end 285 is moved toward the core 290, as shown, causing the locking lever to pivot about pivot point 270 and disengage the protrusion 275 from the notch 260. First spring 255 causes the lens cover unit 132 to move to the closed position.

As illustrated in FIG. 2B, when the lens cover unit 132 moves to the second, open position on the right, the lens cover 234 also moves to a position that is displaced from the lens 126*a*, so that the lens 126*a* is exposed. The solenoid 280 is not energized such that the locking lever 265 end 285 is not attracted to the core 290 and the lens cover 235 remains in the open position, latched by the combination of the protrusion 275 and notch 260. While first spring 255 is stretched and applies force to close the lens cover unit, such force is not sufficient to overcome the latching force provided by the combination of the protrusion 275 engaged with the notch 260.

The indicator cover 236 is also in a position that is displaced from the indicator 126*b*, so that the indicator 126*b* is exposed through an exposure hole 236*a*. The camera 126 having the lens 126*a* exposed after the movement of the lens cover 234 is able to shoot an image.

The upper frame 224*a* has an upper part that is covered with a horizontally-long member 228*a* that is a part of the rear cover 128. The upper frame 124*a* has an intermediate member slightly protruding forward and the intermediate member 224*aa* is disposed between the horizontally-long member 228*a* and the glass 127. The intermediate member 224 *aa* is coplanar with the horizontally-long member 228*a*, the glass 127 and the knob 238 so as to have integral design. The intermediate member 224*aa* has the same height as the knob 238. The intermediate member 224*aa* has a cut-out 224*ab*. The knob 238 slides in X direction in a region between the horizontally-long member 228*a* and the glass 127 and in the range of the cut-out 224*ab*.

The intermediate member 224*aa* protects the surrounding of the glass 127. The intermediate member 224*aa* serves as the member to position the glass 127 for attachment (e.g., bonding), and this facilitates the assembly.

The lid 116 is assembled by firstly assembling the lens cover unit 132 with the frame 124, assembling the display device 122 with the frame 124, assembling the glass 127 with the frame 124 while using the intermediate member 224*aa* as the positioning member, and lastly attaching the rear cover 128 including the horizontally-long member 228*a*. The rear cover 128 of this electronic apparatus 110 does not relate to the mechanism including the lens cover unit 132.

Figure 2C:
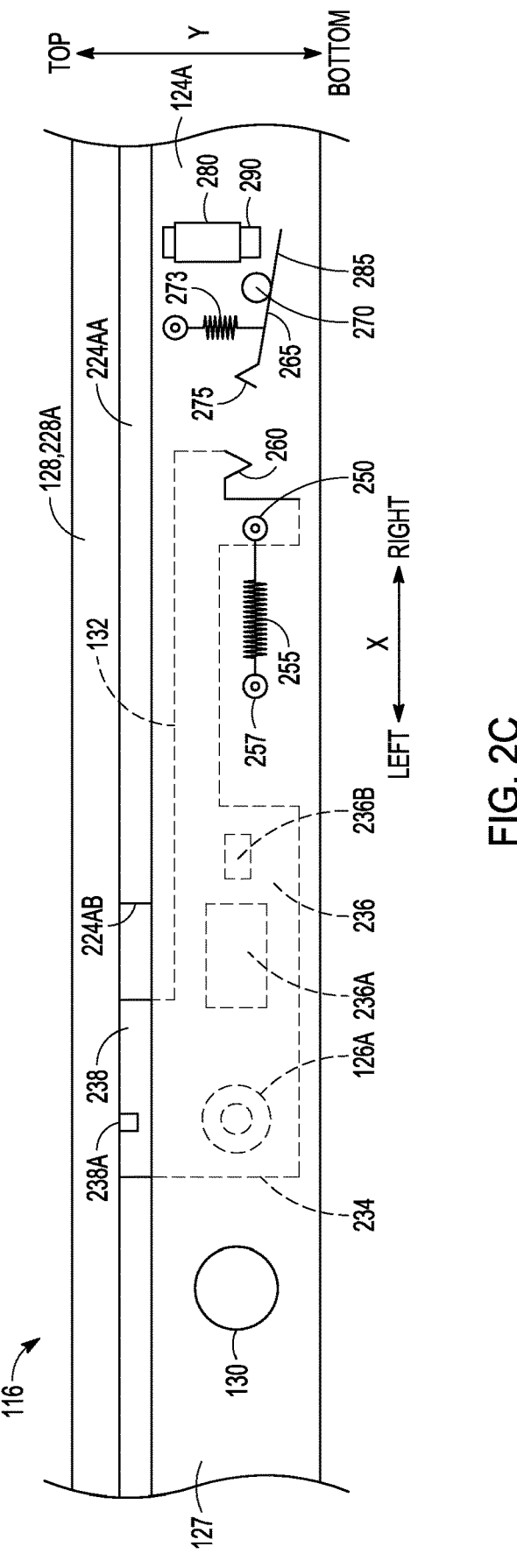
FIG. 2C is a block diagram illustrating a lens cover unit in a closed position and also shows non-actuation of a closing solenoid according to an example embodiment.

FIG. 2C shows the lens cover unit 132 in a closed position and also shows non-actuation of the solenoid 280. In this position, actuation of the solenoid will have no effect on the lens cover unit 132, as the first spring 255 biases the lens cover unit 132 in the closed position.

Figure 3:
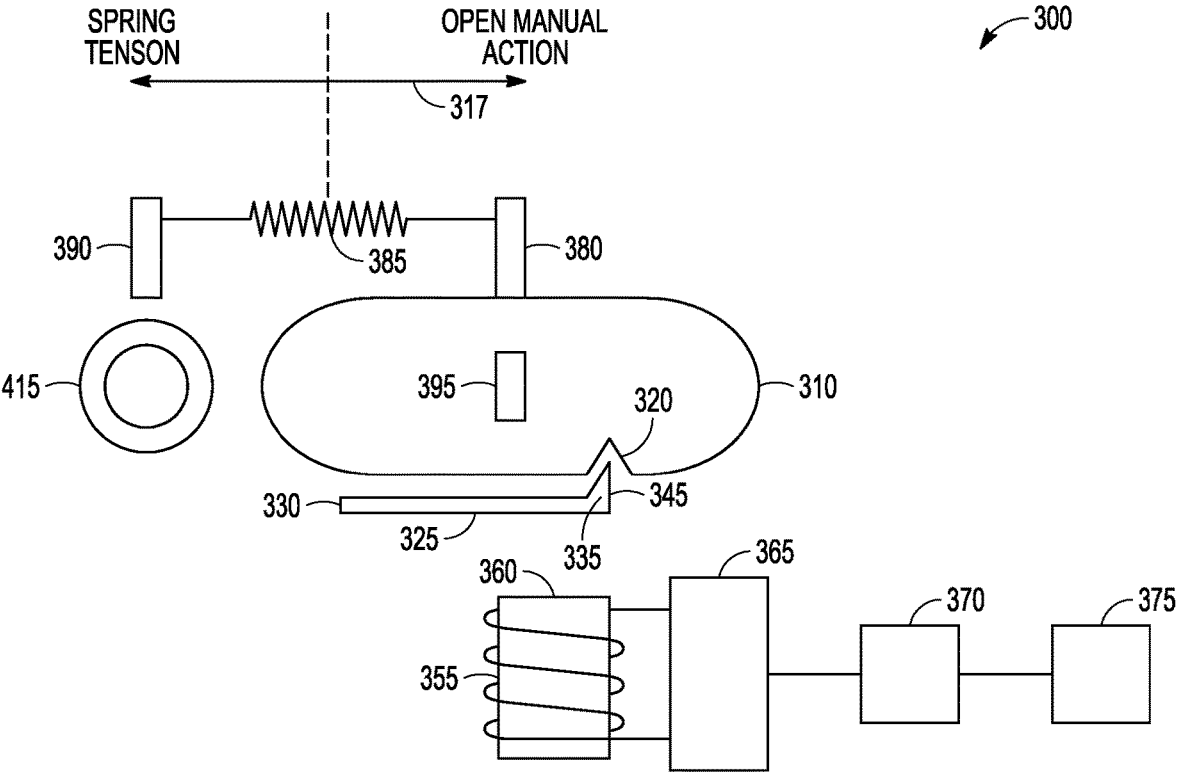
FIG. 3 is a block diagram illustrating operation of an alternative privacy device according to an example embodiment.

FIG. 3 is a block diagram illustrating operation of an alternative privacy device 300. Device 300 also includes a slidable lens cover 310 supported by a device that includes a camera and camera lens 315. The lens cover 310 is slidable in a lateral direction shown at 317 and is shown in an open position, allowing camera lens 315 to capture images. In one example, the lens cover 310 includes a recess 320 shaped to retentatively engage with a flexible lever 325. The flexible lever 325 is supported on a first end 330 by the device, and has a protrusion 335 on a second end that is biased into the recess 320. The second end may include a ramp portion 340 and an engagement surface 345 to mate with a lens cover engagement surface 350. The engagement surfaces 345 and 350 may be substantially flat and parallel to each other and generally orthogonal to the direction of movement of the slidable cover 310. Such an arrangement requires a significant force to move the lens cover 310 to the closed position in one example.

A solenoid 355 may be positioned close to the protrusion 335 of the flexible lever 325 and include a core 360 that when energized, attracts the flexible lever 325 protrusion 335 out of retentive contact with the recess 320. Energization may be provided by a transistor controlled driver circuit 365 controlled by a microcontroller 370. An interface 375 may couple the microcontroller 370 to a device incorporating the privacy device 300, such as a personal computer, phone, external webcam, or other device.

Lens cover 310 may also include a first post 380 for coupling to a spring 385. Spring 385 is coupled between post 380 and a second post 385. Spring 385 will be tensioned while the lens cover is in the open position to provide force to move the lens cover to a closed position upon disengagement of the protrusion via energization of the solenoid 355. A tactile post 395 may be used to physically move the lens cover 110 back to the open position, with the ramp flexing the lever 325 to allow the protrusion 335 to engage with the recess 320.

In various examples, actuation of the solenoid 355 may be triggered by the ending of a video conference call, or even upon detection of undesired objects in images captured by the camera, unexpected movements of the device, or other types of occlusion, or low bandwidth detection to prevent increasing data rate deranging quality of a call in harsh connectivity conditions.

Figure 4:
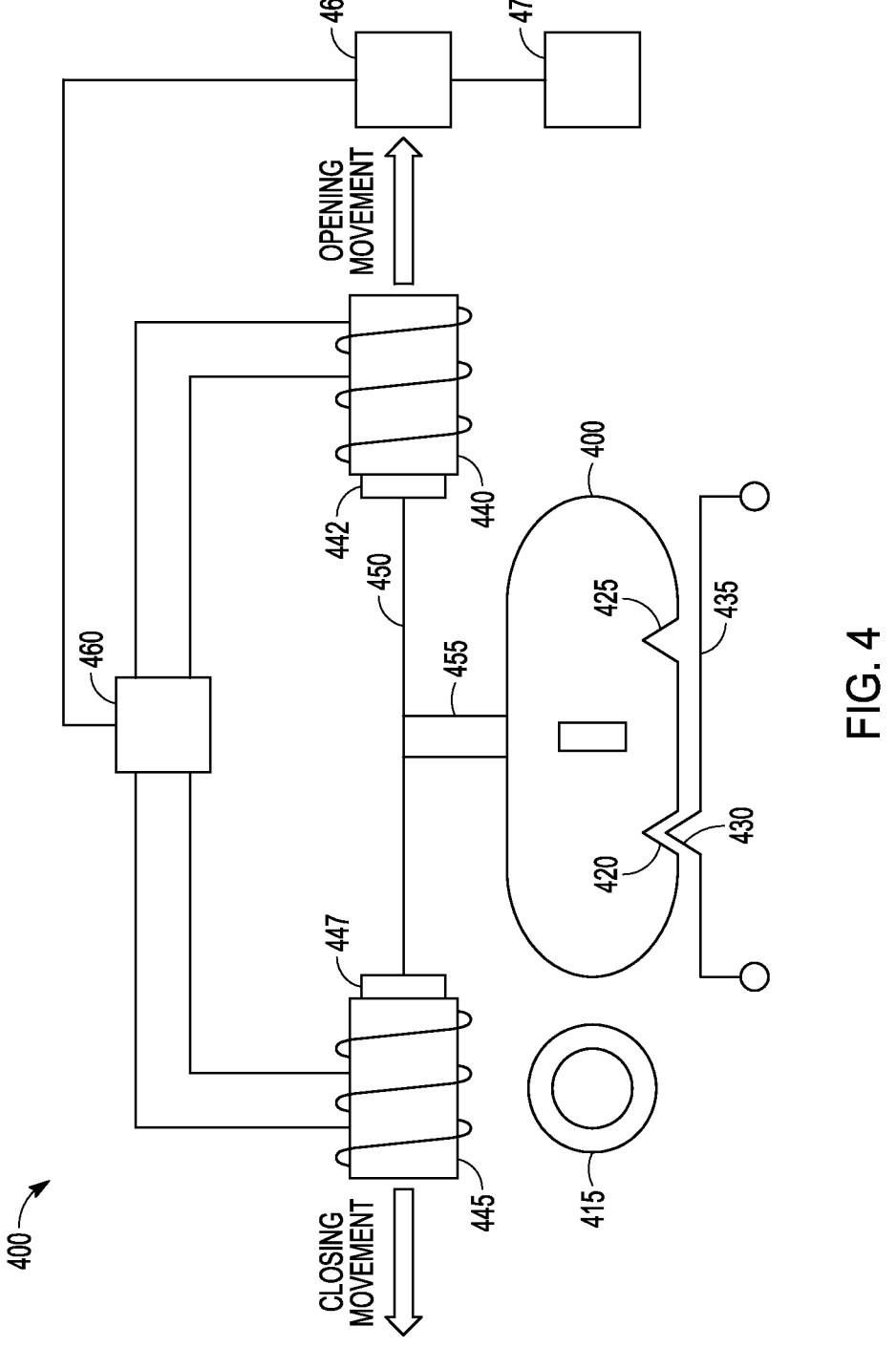
FIG. 4 is a block diagram of an alternative dual activation privacy device according to an example embodiment.

FIG. 4 is a block diagram of an alternative dual activation privacy device 400. Device 400 also includes a slidable lens cover 410 supported by a device that includes a camera and camera lens 415. The lens cover 410 is slidable in a lateral direction and is shown in an open position, allowing camera lens 415 to capture images. In one example, the lens cover 410 includes an open position recess 420 and a closed position recess 425. The recesses 420 and 425 are shaped to alternately and retentatively engage with a protrusion 430 on a flexible lever 435. The flexible lever 425 is supported on both ends by the device. The recesses 420 and 425 and protrusion 430 are angled to allow a desired amount of force to disengage and allow lateral movement of the lens cover 410. The flexible lever 425 is also flexible enough to allow such disengagement.

Dual activation of the lens cover 410 is provided by an opening solenoid 440 and a closing solenoid 445. Each solenoid has a respective opening moveable core 442 and closing moveable core 447. Each movable core is coupled to a shaft 450 that is coupled to the lens cover 410 via post 455 or other means. The shaft 450 in one example, extends laterally from the moveable cores in the same direction as movement of the lens cover 410, each core when actuated moving away from the post 455, pushing the lens cover 410 with a force suitable to overcome the retentive force of the protrusion 430 in either of the recesses 430 and 435. In further examples, the movement of the core may be reversed, such that each core moves toward the post 455.

A driver circuit 460 is configured to drive both solenoids 440 and 445, one at a time, to ether move the lens cover 410 to the open or closed positions respectively. A user may also utilize a tactile post 463 to move the lens cover 410 to different positions if desired. Driver circuit 460 is controlled by a microcontroller 470. An interface 475 may couple the microcontroller 370 to a device incorporating the privacy device 300, such as a personal computer, phone, external webcam, or other device.

In various examples, actuation of the solenoids 440 and 445 may be triggered by the beginning or ending of a video conference call, or even upon detection of undesired objects in images captured by the camera, unexpected movements of the device, or other types of occlusion, or low bandwidth detection to prevent increasing data rate deranging quality of a call in harsh connectivity conditions.

Figure 5:
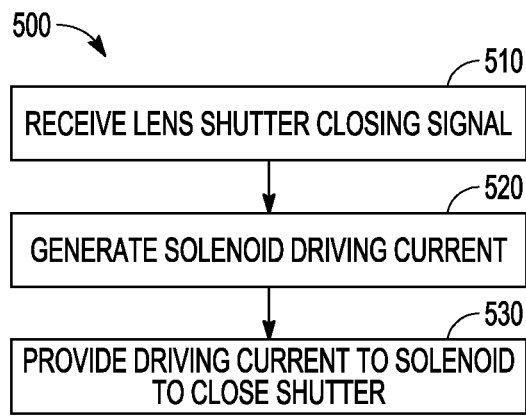
FIG. 5 is a flowchart illustrating a computer implemented method for controlling a privacy shutter according to an example embodiment.

FIG. 5 is a flowchart illustrating a computer implemented method 500 for controlling a privacy shutter. Method 500 begins at operation 510, by receiving a camera privacy shutter closing signal in a computing device have a camera with a lens. At operation 520, a solenoid driver is turned on to generate driving current in response to receiving the camera privacy closing signal. The driving current is provided to a shutter closing solenoid in response to the shutter closing signal, the solenoid being coupled to cause the shutter to move to cover the lens of the camera.

Figure 6:
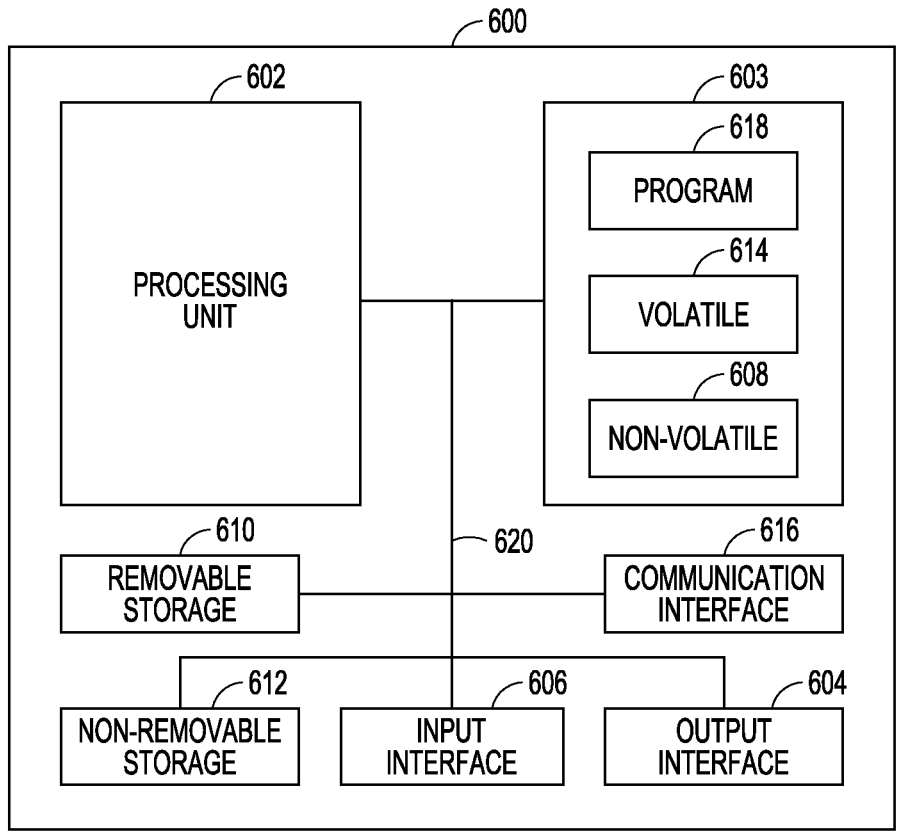
FIG. 6 is a block schematic diagram of a computer system to implement one or more example embodiments.

FIG. 6 is a block schematic diagram of a computer system 600 to control a camera privacy shutter solenoid and for performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A privacy device includes a shutter moveably mounted along a first axis to a frame supporting a camera having a lens, a closing solenoid supported by the frame and including an closing core, and control circuitry coupled to the closing solenoid to cause the shutter to cover the lens.

2. The privacy device of example 1 and further including a spring coupled to the frame and the shutter and biased to move the shutter to cover the lens and a locking lever supported by the frame on a first end, wherein a second end of the lever is configured to retentively mate with a recess in the shutter in response to the shutter being in an open position and is positioned proximate the closing solenoid to flex and release from the detent on actuation of the closing solenoid by the control circuitry to cover the lens in a closed position.

3. The privacy device of example 2 wherein the shutter comprises a tactile post configured to move the shutter to the open position in response to suitable external force applied to the post.

4. The privacy device of any of examples 1-3 and wherein the closing core is moveable in response to actuation of the closing solenoid, and further comprising a shaft coupled to the moveable closing core and the shutter such that actuation of the solenoid by the control circuitry moves the shutter to cover the lens in a closed position.

5. The privacy device of example 4 and further comprising a spring-loaded latch configured to retentively mate with a recess in the shutter to hold the shutter in a selected position absent lateral force being applied to the shutter.

6. The privacy device of any of examples 4-5 and further including an opening solenoid supported by the frame and including an opening solenoid moveable core and an opening shaft coupled to the opening solenoid moveable core and the shutter such that actuation of the opening solenoid by the control circuitry moves the shutter to an open position to uncover the lens.

7. The privacy device of example 6 wherein the control circuitry is configured to receive a close shutter signal to move the shutter to the closed position and an open shutter signal to move the shutter to the open position.

8. The privacy device of example 7 wherein the control circuitry is configured to receive the close shutter signal from an executing application.

9. The privacy device of any of examples 6-8 and further including a spring-loaded latch configured to alternately retentively mate with an open recess and a closed recess in the shutter to hold the shutter in a selected position absent lateral force being applied to the shutter.

10. The privacy device of any of examples 6-9 wherein the shutter includes a tactile post configured to move the shutter to an open position or the closed position in response to suitable external force applied to the post.

11. The privacy device of any of examples 1-10 wherein the control circuitry is coupled to receive a close shutter signal and responsive to the closed shutter signal, actuate the closing solenoid to cause the shutter to cover the lens.

12. The privacy device of example 11 wherein the close shutter signal is received in response to a user command or switch operation by the user.

13. The privacy device of example 11 wherein the close shutter signal is generated responsive to a command from an executing application.

14. The privacy device of any of examples 1-13 wherein the frame includes a webcam housing, a laptop housing, or a phone housing.

15. A computing system includes a housing, a processor and memory supported by the housing, a camera supported by the housing the camera having a lens, a shutter moveably mounted along a first axis to the housing, a closing solenoid supported by the housing and including a core, and control circuitry coupled to the closing solenoid to cause the shutter to move along the first axis to cover the lens.

16. The computing system of example 15 wherein the control circuitry includes a transistor to drive the solenoid.

17. The computing system of any of examples 15-16 and wherein the closing core is moveable in response to actuation of the closing solenoid, and further including a shaft coupled to the moveable closing core and the shutter such that actuation of the solenoid by the control circuitry moves the shutter to cover the lens in a closed position.

18. The computing device of example 17 and further including a spring-loaded latch configured to retentively mate with a recess in the shutter to hold the shutter in a selected position absent lateral force being applied to the shutter.

19. The computing device of example 17 and further including an opening solenoid supported by the housing and including an opening solenoid moveable core and an opening shaft coupled to the opening solenoid moveable core and the shutter such that actuation of the opening solenoid by the control circuitry moves the shutter to an open position to uncover the lens.

20. A method includes receiving a camera privacy shutter closing signal in a computing device have a camera with a lens, turning on a solenoid driver to generate driving current in response to receiving the camera privacy closing signal, and providing the driving current to a shutter closing solenoid in response to the shutter closing signal, the solenoid being coupled to cause the shutter to move to cover the lens of the camera.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A privacy device comprising:
a shutter moveably mounted along a first axis to a frame supporting a camera having a lens;
a closing solenoid supported by the frame and including a closing core;
control circuitry coupled to the closing solenoid to cause the shutter to cover the lens; and
a spring coupled to the frame and the shutter and biased to move the shutter to cover the lens; and
a locking lever supported by the frame on a first end, wherein a second end of the lever is configured to retentively mate with a recess in the shutter in response to the shutter being in an open position and is positioned proximate the closing solenoid to flex and release from the recess on actuation of the closing solenoid by the control circuitry to cover the lens in a closed position.

2. The privacy device of claim 1 wherein the shutter comprises a tactile post configured to move the shutter to the open position in response to suitable external force applied to the post.

3. The privacy device of claim 1 wherein the control circuitry is coupled to receive a close shutter signal and responsive to the closed shutter signal, actuate the closing solenoid to cause the shutter to cover the lens.

4. The privacy device of claim 3 wherein the close shutter signal is received in response to a user command or switch operation by the user.

5. The privacy device of claim 3 wherein the close shutter signal is generated responsive to a command from an executing application.

6. The privacy device of claim 1 wherein the frame comprises a webcam housing, a laptop housing, or a phone housing.

7. A privacy device comprising:
a shutter moveably mounted along a first axis to a frame supporting a camera having a lens;

a closing solenoid supported by the frame and including a closing core, wherein the closing core is moveable in response to actuation of the closing solenoid;
control circuitry coupled to the closing solenoid to cause the shutter to cover the lens;
a shaft coupled to the moveable closing core and the shutter such that actuation of the solenoid by the control circuitry moves the shutter to cover the lens in a closed position; and
a spring-loaded latch configured to retentively mate with a recess in the shutter to hold the shutter in a selected position absent lateral force being applied to the shutter.

8. The privacy device of claim 7 and further comprising:
an opening solenoid supported by the frame and including an opening solenoid moveable core; and
an opening shaft coupled to the opening solenoid moveable core and the shutter such that actuation of the opening solenoid by the control circuitry moves the shutter to an open position to uncover the lens.

9. The privacy device of claim 8 wherein the control circuitry is configured to receive a close shutter signal to move the shutter to the closed position and an open shutter signal to move the shutter to the open position.

10. The privacy device of claim 9 wherein the control circuitry is configured to receive the close shutter signal from an executing application.

11. The privacy device of claim 8 wherein the shutter comprises a tactile post configured to move the shutter to an open position or the closed position in response to suitable external force applied to the post.

12. A computing system comprising:
a housing;
a processor and memory supported by the housing;
a camera supported by the housing the camera having a lens;
a shutter moveably mounted along a first axis to the housing;
a closing solenoid supported by the housing and including a core;
control circuitry coupled to the closing solenoid to cause the shutter to move along the first axis to cover the lens, wherein the closing core is moveable in response to actuation of the closing solenoid, a shaft coupled to the moveable closing core and the shutter such that actuation of the solenoid by the control circuitry moves the shutter to cover the lens in a closed position; and
a spring-loaded latch configured to retentively mate with a recess in the shutter to hold the shutter in a selected position absent lateral force being applied to the shutter.

13. The computing system of claim 12 wherein the control circuitry comprises a transistor to drive the solenoid.

14. The computing system of claim 12 and further comprising:
an opening solenoid supported by the housing and including an opening solenoid moveable core; and
an opening shaft coupled to the opening solenoid moveable core and the shutter such that actuation of the opening solenoid by the control circuitry moves the shutter to an open position to uncover the lens.

* * * * *